United States Patent
Lindquist et al.

(10) Patent No.: US 6,373,909 B2
(45) Date of Patent: *Apr. 16, 2002

(54) COMMUNICATIONS TERMINAL HAVING A RECEIVER AND METHOD FOR REMOVING KNOWN INTERFERERS FROM A DIGITIZED INTERMEDIATE FREQUENCY SIGNAL

(75) Inventors: Björn Lindquist, Bjärred; Jan Celander, Lund; Sven Mattisson, Bjärred, all of (SE)

(73) Assignee: Telefonaktiebolaget LM Ericsson (PUBL), Stockholm (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/426,782

(22) Filed: Oct. 22, 1999

(51) Int. Cl.[7] ............... H03D 1/04; H03D 1/06; H03K 5/01; H03K 6/04; H04B 1/10; H04L 1/00; H04L 25/08

(52) U.S. Cl. ............ 375/346; 375/343; 455/296

(58) Field of Search ............... 375/343, 344, 375/346, 348, 350; 455/296, 303, 309, 311, 312, 324; 329/318, 320, 349, 353

(56) References Cited

U.S. PATENT DOCUMENTS

| 5,140,699 A | 8/1992 | Kozak | |
|---|---|---|---|
| 5,442,655 A | 8/1995 | Dedic et al. | 375/340 |
| 5,479,453 A * | 12/1995 | Anvari et al. | 375/348 |
| 5,519,890 A | 5/1996 | Pinckley | |
| 5,579,347 A * | 11/1996 | Lindquist et al. | 375/346 |
| 5,584,066 A | 12/1996 | Okanobu | 455/302 |
| 5,838,735 A * | 11/1998 | Khullar | 375/319 |
| 5,914,990 A * | 6/1999 | Soderkvist | 375/350 |
| 5,953,643 A * | 9/1999 | Speake et al. | 455/324 |
| 6,219,534 B1 * | 4/2001 | Torii | 455/303 |
| 6,259,752 B1 * | 7/2001 | Domino et al. | 375/346 |

FOREIGN PATENT DOCUMENTS

| EP | 0 881 785 A1 | 2/1998 |
|---|---|---|
| EP | 0881785 A1 | 12/1998 |
| GB | 2 292 867 A | 3/1996 |
| GB | 2 311 444 A | 9/1997 |
| JP | 07303126 A | 11/1995 |
| JP | 09168037 | 6/1997 |
| JP | 09214372 | 8/1997 |
| JP | 10041992 A | 2/1998 |
| WO | WO 98/09393 | 3/1998 |

* cited by examiner

*Primary Examiner*—Chi Pham
*Assistant Examiner*—Phuong Phu
(74) *Attorney, Agent, or Firm*—Jenkens & Gilchrist A Professional Corporation

(57) ABSTRACT

A communications terminal having a receiver and a method therefor is provided that substantially removes a known interferer from a digitally translated intermediate frequency signal. More specifically, the receiver includes an antenna for receiving a signal, and at least one combination of a mixer and filter for translating in the analog domain the signal to the intermediate frequency signal while maintaining separation from baseband. The receiver also includes a digitizer for digitally translating the intermediate frequency signal containing the known interferer from the analog domain into the digital domain, and an interference cancellation system for removing the known interferer from the digitally translated intermediate frequency signal by utilizing either a DC offset compensator or a correlator compensator.

25 Claims, 4 Drawing Sheets

COMMUNICATIONS TERMINAL HAVING A RECEIVER AND METHOD FOR REMOVING KNOWN INTERFERERS FROM A DIGITIZED INTERMEDIATE FREQUENCY SIGNAL

BACKGROUND OF THE INVENTION

1. Technical Field of the Invention

The present invention generally relates to the wireless telecommunications field and, in particular, to a communications terminal having a receiver and method for substantially cancelling known interferers from a digitally translated intermediate frequency (IF) signal.

2. Description of Related Art

A mobile phone incorporates many components including a receiver that operates to demodulate signals received from a transmitter by removing a carrier signal and outputting a desired signal. Receivers commonly used today include homodyne receivers, heterodyne receivers, superheterodyne receivers and double superheterodyne receivers.

Of course, the above-mentioned receivers are sensitive to interference from external jamming equipment and internal equipment. For example, the mobile phone used in accordance with the Global System for Mobile Communications (GSM) Standard has an interference problem attributable to a 13 MHZ internal clock which generates 72nd and 73rd harmonics that interfere with a desired signal on channels 5 and 70, respectively.

Currently, the interference caused by the clock harmonics may be addressed by paying particular attention to the shielding and decoupling within the mobile phone which can be a very expensive and complicated task. Another technique used today to cancel the known interferers (e.g., 72nd and 73rd harmonics) caused by the 13 MHZ internal clock, is to in the receiver translate in the analog domain the signals received from the antenna down to baseband so that the clock harmonics are translated to a direct current (DC) offset voltage which is then removed by analog or digital DC-offset cancellation techniques. Unfortunately, the receivers that translate the received signals down to baseband in the analog domain must also remove a lot of extraneous DC offset voltages that are created by mixers used to produce the analog baseband signals or by analog circuitry used to process the analog baseband signals. Extraneous DC offset voltages may also be due to component mismatches and carrier leakage. Consequently, the extraneous DC offset voltages must be removed since they can be larger than the desired signal. The extraneous DC offsets is one reason why digitizing an IF signal is more attractive than digitizing baseband signals.

Accordingly, there is a need for a communications terminal having a receiver and method that effectively removes known in-band interferers from received IF signals that are initially separated from baseband signals in analog domain and later digitized in the digital domain, so as to avoid the undesirable extraneous DC offset voltages associated with traditional communications terminals. This need and other needs are satisfied by the communications terminal and method of the present invention.

BRIEF DESCRIPTION OF THE INVENTION

The present invention is a communications terminal having a receiver and method that substantially removes a known interferer from a received IF signal that is digitized. More specifically, the receiver includes an antenna for receiving a signal, and at least one combination of a mixer and filter for translating the signal in the analog domain to an IF signal while maintaining separation from the baseband. The receiver also includes a digitizer for digitally translating the IF signal containing the known interferer from the analog domain into the digital domain, and an interference cancellation system for removing the known interferer from the digitally translated IF signal by utilizing some signal processing means.

In accordance with the present invention, there is provided a method and receiver using a digital DC offset compensator to remove from a digitized IF signal a known interferer including a centered unmodulated interferer caused by the 72nd and 73rd harmonics of a 13 MHZ internal clock.

Also in accordance with the present invention, there is provided a method and receiver using a digital signal processing block to remove from a digitized IF signal a known interferer including an off-centered unmodulated interferer or a modulated interferer each having a known waveform.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
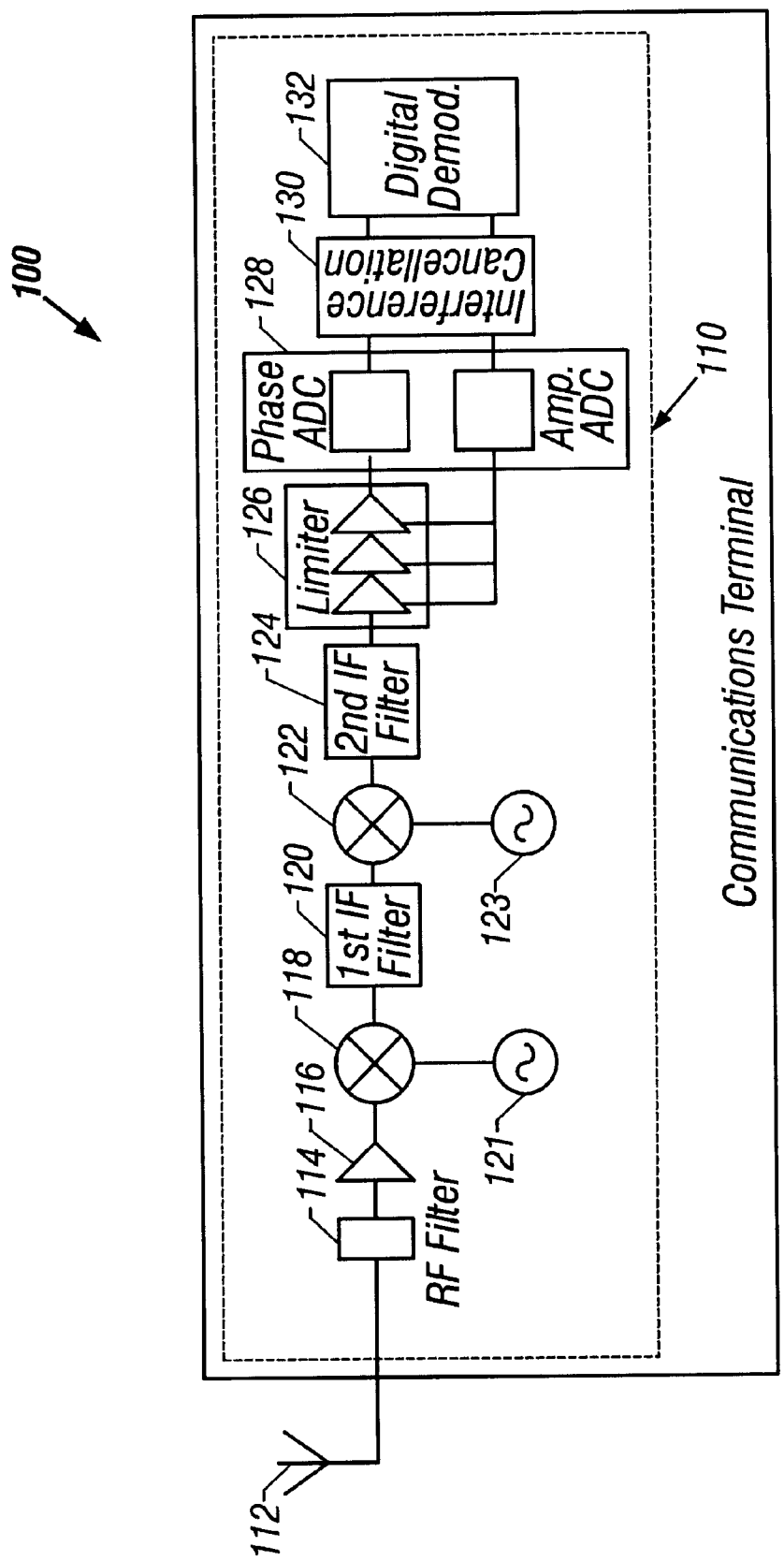
FIG. 1 is a block diagram of a communications terminal having a double superheterodyne receiver in accordance with the present invention.

Referring to the Drawings, wherein like numerals represent like parts throughout FIGS. 1–6, there are disclosed two embodiments of an exemplary communications terminal 100 in accordance with the present invention.

Although the communications terminal 100 will be described with reference to a double superheterodyne receiver 110 (FIGS. 1–5) and a low intermediate frequency receiver 610 (FIG. 6), it should be understood that the present invention can be used with other types of receivers including, for example, heterodyne and superheterodyne receivers that do not translate the IF signals down to baseband in the analog domain. Accordingly, the communication terminal 100 and double superheterodyne receiver 110 described should not be construed in such a limited manner.

Referring to FIG. 1, there is illustrated the basic components associated with the communications terminal 100 and double superheterodyne receiver 110 of the present invention. Basically, the communications terminal 100 utilizes an interference cancellation system 130 within the double superheterodyne receiver 110 to effectively cancel known interferers from a digitized IF signal by removing a DC offset voltage caused by a centered unmodulated interferer (first embodiment see FIGS. 2 and 3) or by removing a known waveform of an off-centered unmodulated interferer or a modulated interferer (second embodiment see FIG. 4). In other words, the communications terminal 100 effectively removes known interferers from IF signals that are initially separated from baseband in analog domain and later digitized in digital domain so as to avoid the undesirable extraneous DC offset voltages associated with traditional communications terminals that translate the IF signals to baseband in the analog domain.

The communication terminal 100 can be any communication device that communicates over a wireless communication link such as a cordless or cellular mobile phone, two way radio, MODEM (modulator-demodulator), radio, base station, or the like. The communications terminal 100 incorporates the exemplary double superheterodyne receiver 110 which includes an antenna 112 that receives a signal on one of a plurality of up-link channels and outputs the signal to a radio frequency (RF) filter 114. The RF filter 114 permits the received signal located within a predetermined pass band (e.g., 925 MHZ to 960 MHZ for the EGSM standard) to pass through an amplifier 116 and into a first mixer 118, while attenuating the received signal located outside the pass band.

The first mixer 118 steps down or translates in the analog domain the frequency of the received signal passed by the RF filter 114 to a predetermined first IF signal which is separated from baseband and is inputted to a first IF filter 120. A first oscillator 121 connected to the first mixer 118 enables the frequency translation of the signal to the first IF signal.

The first IF signal is filtered by the first IF filter 120 and output to a second mixer 122 that combines the first IF signal with a signal from a second oscillator 123. The second mixer 122 using the signal from the second oscillator 123 operates to step down or translate in the analog domain the frequency of the first IF signal to a predetermined second IF signal. The second IF signal is separated from baseband and is input to a second IF (IF) filter 124. It should be understood that the bandwidth of the second IF filter 124 is preferably equal to the bandwidth of one channel (e.g., channel 5 or channel 70 in GSM) and each channel in the frequency band passed by the second IF filter 124 has a unique center or middle frequency that contains most, if not all, of the information of the signal received by the antenna 112.

The second IF signal is input to a limiter 126 operable to prevent an amplitude of the second IF signal from exceeding a predetermined level and operable to preserve the shape of the second IF signal at amplitudes less than the predetermined level. The limiter 126 outputs the second IF signal to a digitizer 128.

The digitizer 128 operates to digitize or digitally translate in the digital domain the second IF signal containing a known interferer (described below) to another frequency which could be a new IF or baseband signal. The digitizer 128 can be referred to as a phase-amplitude digitizer or an IF sampling receiver. It should be understood that the digitizer 128 should have enough resolution in the analog-to-digital (A/D) conversion to handle the known interferers, for instance a log amplitude A/D converter has a limit as to what magnitude of the unmodulated co-channel interferers can be tolerated because the resolution of the desired signal is reduced with larger interferers.

The digitizer 128 outputs the digitally translated second IF signal to the interference cancellation system 130 which effectively cancels the known interferers included within the digitally translated second IF signal. The known interferers are classified as a centered unmodulated interferer described in greater detail with respect to the first embodiment of the interference cancellation system 130 (see FIGS. 2 and 3), or classified as a modulated interferer or an off-centered unmodulated interferer described in greater detail with respect the second embodiment of the interference cancellation system (see FIG. 3). After removing the known interferers from the digitized second IF signal, a digital demodulator 132 coupled to the interference cancellation system 130 operates to demodulate the remaining second IF signal.

Figure 2:
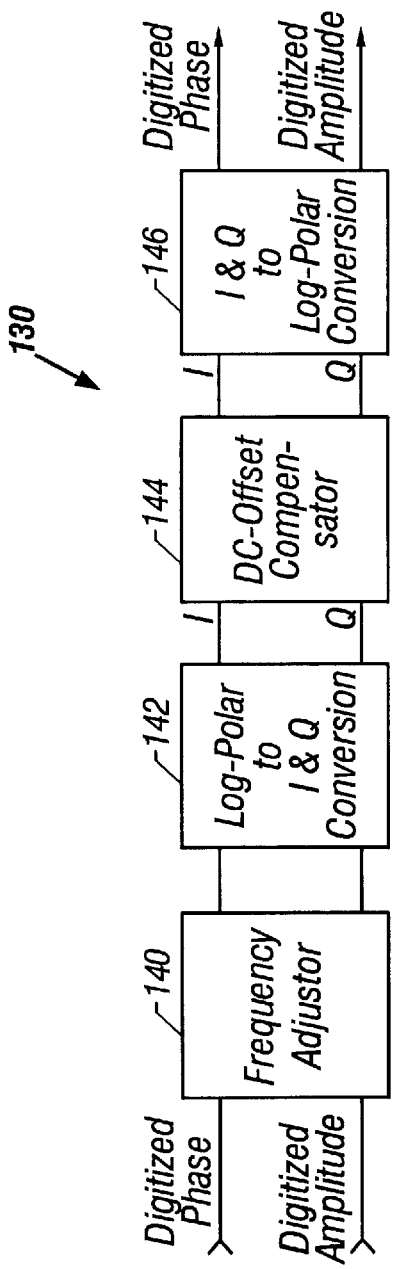
FIG. 2 is a block diagram illustrating in greater detail a first embodiment of an interference cancellation system incorporated within the double superheterodyne receiver shown in FIG. 1.

Referring to FIG. 2, there is illustrated in greater detail the first embodiment of the interference cancellation system 130. In the first embodiment, the digitizer 128 operates to digitally translate in the digital domain the second IF signal to a baseband signal so that the known interferer or centered unmodulated interferer can be transformed to a DC offset voltage which is removed by the interference cancellation system 130. More specifically, the second IF signal which is not at baseband in the analog domain is digitally translated in the digital domain by the digitizer 128 to a baseband signal so that the only DC offset voltage created is the DC offset voltage associated with the centered unmodulated interferer. Also, any extraneous DC offset voltages due to component mismatches and carrier leakage (for example) are not created, in accordance with the present invention, because the second IF signal sampled is "DC free" since it is higher than the baseband frequency before entering the digitizer 128.

The centered unmodulated interferer associated with the first embodiment is an unmodulated interferer centered in a middle of a channel used by the communications terminal 100. For example, the known centered unmodulated interferers can be caused by the 72nd and 73rd harmonics of the 13 MHZ internal reference clock and, without employing the techniques of the present invention, the 72nd and 73rd harmonics would interfere with the desired signal on channels 5 and 70, respectively, used by the traditional GSM mobile phone.

In accordance with the first embodiment, the interference cancellation system 130 includes a frequency adjustor 140 operable to phase rotate or "add a ramp" to the digitized phase samples in the digitally translated second IF signal so as to be converted to baseband. The phase rotation can be required because in GSM the sampling frequency is 13/48 MHZ and the second IF signal is at 6 MHz. The frequency adjustor 140 may be referred to as a derotation unit or a frequency normation unit.

The frequency adjustor 140 can be coupled to a first convertor 142 that converts the rotated second IF signal from log-polar format to a Cartesian (I and Q) format. Thereafter, a DC offset compensator 144 operates to remove the DC offset voltages within the converted second IF signal, where the DC offset voltage is due to the known centered unmodulated interferer.

The DC offset compensator 144 can be coupled to a second convertor 146 that converts the second IF signal having the removed DC offset voltage from the Cartesian format to a log-polar format. It should be understood that the removal of the DC offset voltage is independent of the type of detection or A/D conversion made and that the second IF signal could be detected in log-polar format or Cartesian format while the same interference cancellation scheme is applied.

It should also be understood that the frequency adjustor 140 does not necessarily have to rotate the digitally translated intermediate signal to baseband. For instance, the digitizer 128 can automatically move the digitally translated intermediate signal down to baseband if the digitizer subsamples the analog IF signal on a sub-harmonic of the IF signal.

Figure 3:
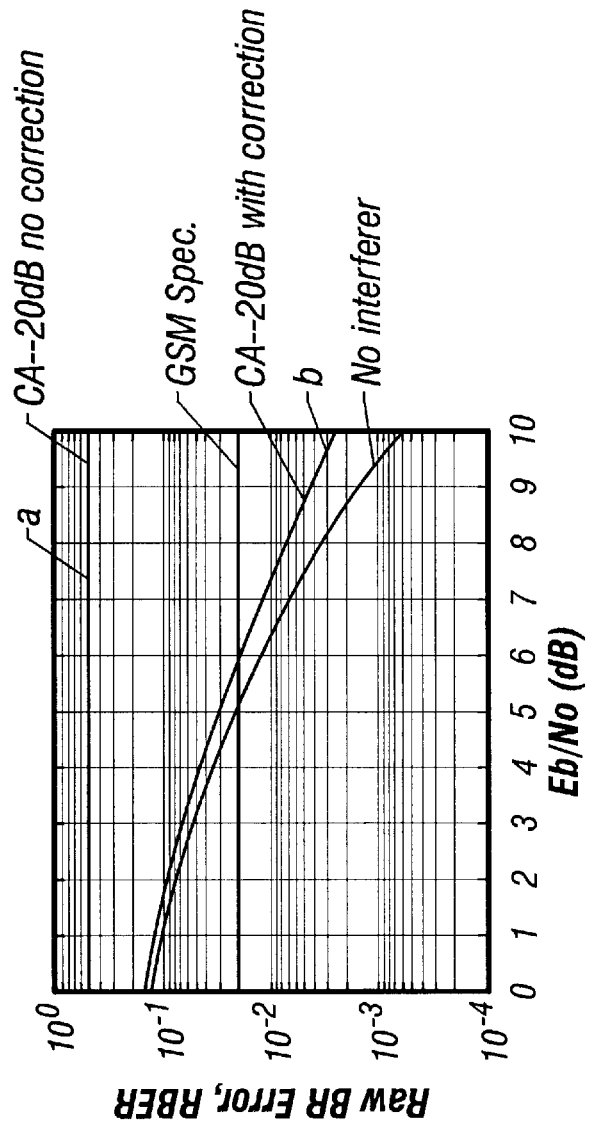
FIG. 3 is a graph indicating the improved performance of the communications terminal after removing a known interferer such as a centered unmodulated interferer using the first embodiment of the interference cancellation system shown in FIG. 2.

Referring to FIG. 3, there is a graph indicating the improved performance of the GSM communications terminal 100 after removing the centered unmodulated interferer using the first embodiment of the interference cancellation system 130. The traditional GSM communications terminal (e.g., GSM mobile phone) would only tolerate an interferer that is approximately 5 dB below a desired signal. However, when a centered unmodulated interferer is approximately 20 dB stronger than the wanted signal it would adversely effect the sensitivity of the traditional receiver by a 50% bit error rate (BER) (see alphanumeric "a"). In contrast, by using the interference cancellation system 130 of the present invention, the same 20 dB strong-centered unmodulated interferer would provide only a 1 dB desensitization of the double superheterodyne receiver 110 (see alphanumeric "b"). Therefore, at least a 20 dB improvement with regard to interference by the centered unmodulated interferers (e.g., 72nd and 73rd harmonics of 13 MH internal clock 123) can be expected which would substantially improve the performance on certain channels (e.g., channels 5 and 70) used by the communications terminal 100.

Figure 4:
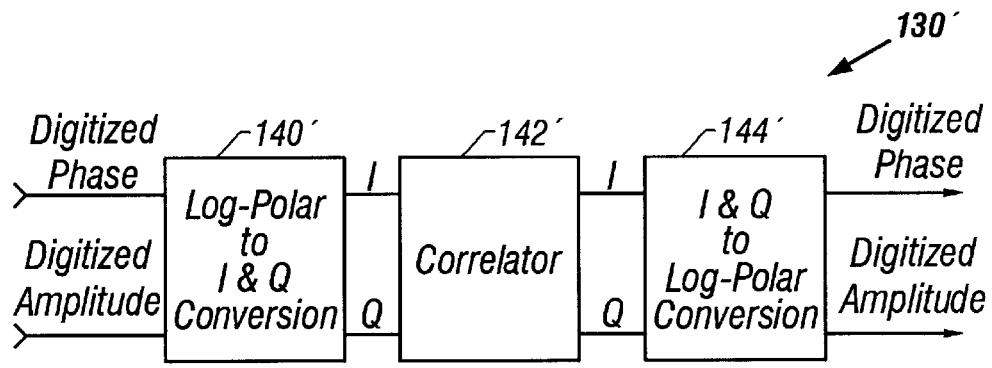
FIG. 4 is a block diagram illustrating in greater detail a second embodiment of the interference cancellation system incorporated within the double superheterodyne receiver shown in FIG. 1.

Referring to FIG. 4, there is shown in greater detail the second embodiment of the interference cancellation system 130 being illustrated with prime referenced numbers. In the second embodiment, the digitizer 128 operates to digitally translate the second IF signal such that the known interferers having a known waveform (including the modulated interferer or the off-centered unmodulated interferer) can be removed by a correlation process within the interference cancellation system 130'. The off-centered unmodulated interferer is an unmodulated interferer off-centered in a middle of a channel used by the communications terminal 100.

The interference cancellation system 130' may include a first convertor 140' that converts the digitally translated second IF signal containing the off-centered unmodulated interferer or modulated interferer from log-polar format to Cartesian (I and Q) format.

The first convertor 140' can be coupled to a correlator compensator 142' that functions to correlate the digitally translated second IF signal and the known waveform of the interferer to enable the removal of the known waveform provided a correlation factor is above a predetermined threshold. Again, the off-centered unmodulated interferer or the modulated interferer each have a known waveform. Thereafter, the correlator 142' can be coupled to a second convertor 144' that converts the remaining second IF signal from Cartesian format to log-polar format. The correlator compensator 142' can also be applied directly on the digitized phase and amplitude samples. Thus, blocks 140' and 144' may not be needed.

Figure 5:
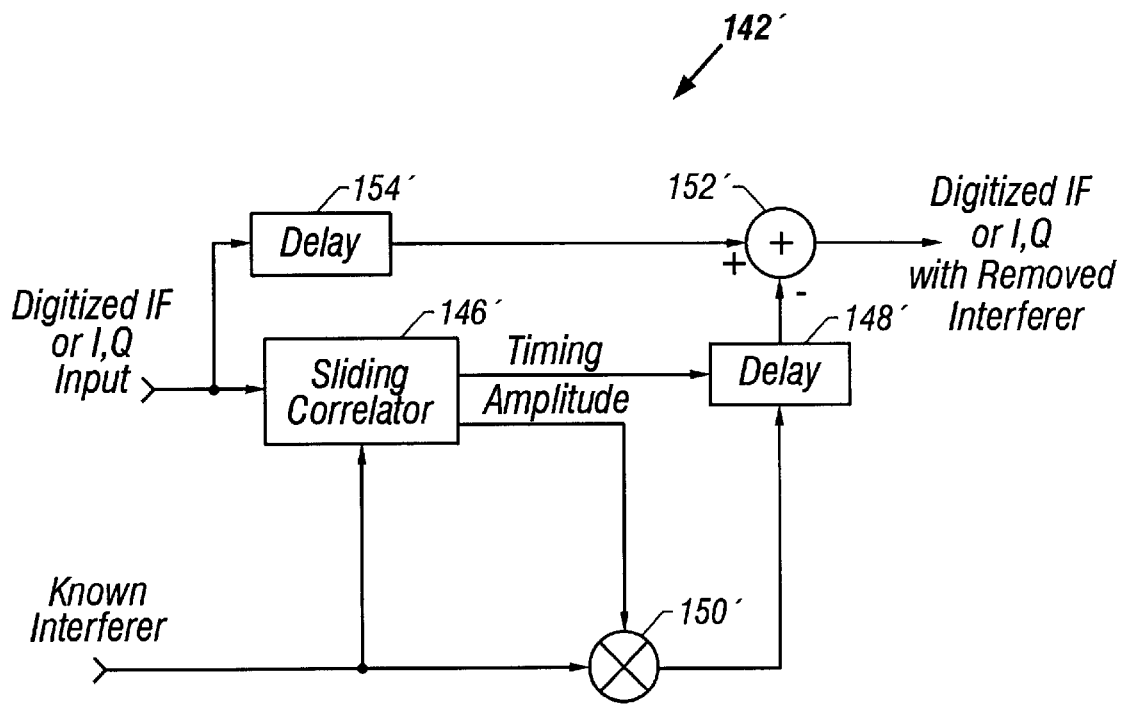
FIG. 5 is a block diagram illustrating in greater detail an exemplary correlator compensator shown in FIG. 4.

The correlator compensator 142' (e.g., digital signal processor) could, for example, include a sliding correlator 146' that finds the timing and amplitude of the known interferer using a delay block 148' and multiplier 150' (see FIG. 5). The correlator compensator 142' further includes a subtractor block 152' that subtracts the found interference from the received signal that has been delayed by delay block 154'.

For example, assuming the desired signal has a frequency of 936.2 MHZ and the off-centered unmodulated interferer is 936 MHZ (e.g., 72*13 MHZ), then if the second IF signal is digitally translated down to baseband, the interferer is known sinusoidal at 200 KHz. The correlator 142' using a 200 KHz signal estimates a multiplying constant and a timing for the 200 KHz known interferer to be removed provided a correlation factor is greater than a predetermined threshold. The multiplying constant could be estimated by correlation estimates or Viterbi estimates. It should be understood that the waveform or amplitude of the 200 KHz interferer is known so that it can be recognized and removed.

The present invention can also address the situation where two known interferers including the centered unmodulated interferer (e.g., 936 MHZ) and the off-centered unmodulated interferer (e.g., 936.2 MHZ) are digitally translated to get both a DC offset voltage removed by the DC offset compensator 144 of the first embodiment and a known waveform removed by the correlator 142' of the second embodiment.

Figure 6:
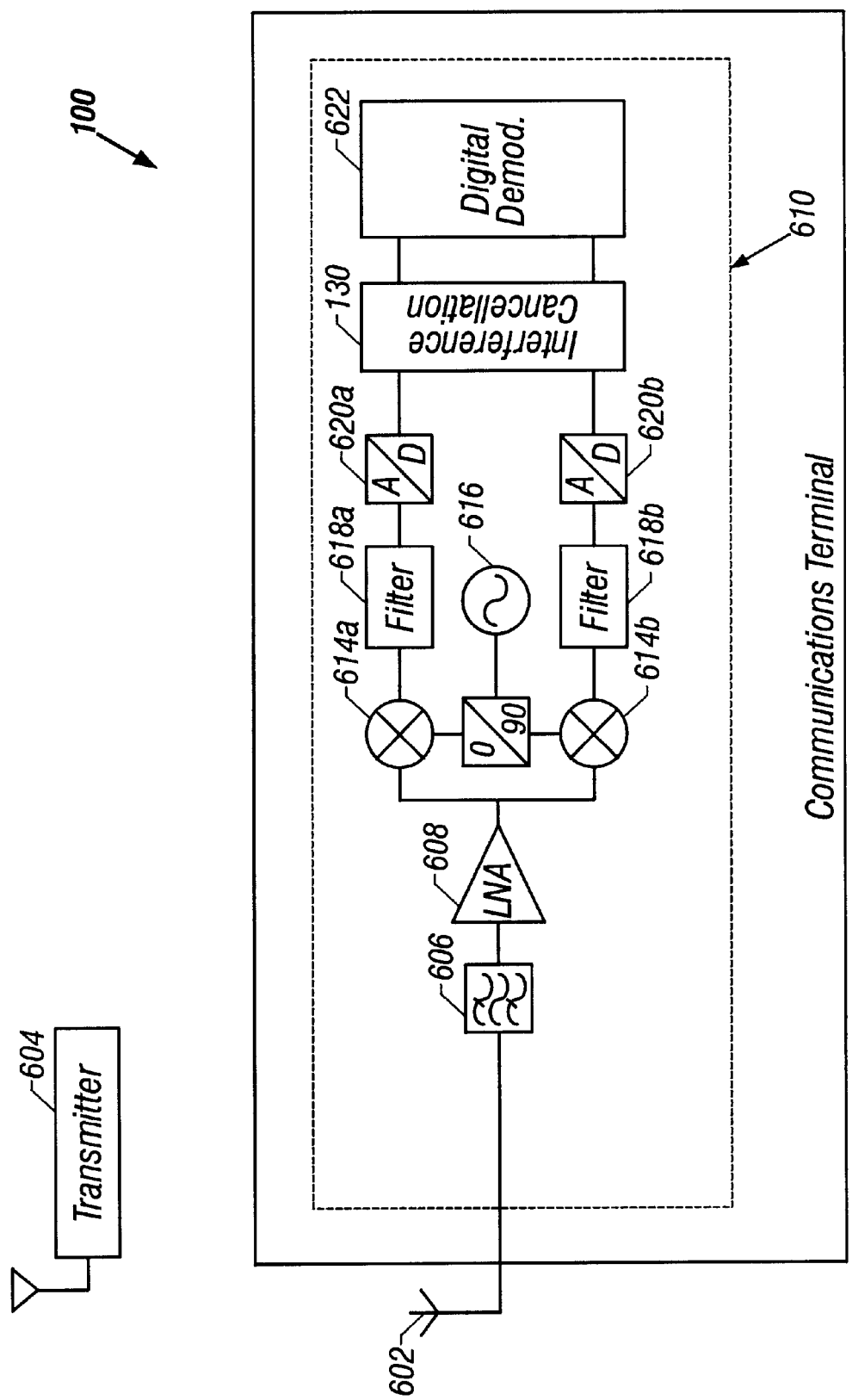
FIG. 6 is a block diagram of a communications terminal having a low intermediate frequency receiver in accordance with the present invention.

Referring to FIG. 6, there is illustrated the basic components associated with the communications terminal 100 and the low-IF receiver 610 of the present invention. Basically, the low-IF receiver 610 includes an antenna 602 for receiving a signal from a transmitter 604. The received signal is filtered by a band pass filter (BPF) 606 designed to pass a desired frequency band (e.g., 925 MHz to 960 MHz for the EGSM standard) from the received signal. The filtered signal is amplified in a low noise amplifier (LNA) 608 and mixed in mixers 614a and 614b. More specifically, each mixer 614a and 614b steps down or translates, in analog domain, the frequency of the amplified signal to a predetermined low-IF frequency separated from baseband. The IF frequency could be half the channel bandwidth or have a higher frequency. The mixers 614a and 614b translate the amplified signal to an Inphase (I) component and a Quadrature (Q) component both of which are in quadrature with one another by using a local oscillator (LO) 616. The two low-IF frequency signals (I and Q components) are then respectively filtered by low pass or bandpass filters 618a and 618b, and then digitized by analog-to-digital convertors (A/Ds) 620a and 620b. Thereafter, the digitized low-IF frequency signals are input to the interference cancellation system 130 which effectively cancels the known interferers included within the digitized low-IF frequency signals. The interference cancellation system 130 effectively removes the interfering signal using a frequency adjustor and DC offset compensator (see FIG. 2), or using a correlator (see FIGS. 4–5) as described above in the earlier examples. After removing the known interferers from the digitized low-IF frequency signals, a digital demodulator 622 coupled to the interference cancellation system 130 operates to demodulate the remaining low-IF signals.

From the foregoing, it can be readily appreciated by those skilled in the art that the present invention provides a method and receiver using a DC offset compensator to remove from a digitized IF signal a known interferer such as a centered unmodulated interferer caused by, for example, the 72nd or 73rd harmonics of a 13 MHZ internal clock. Also the receiver and method as disclosed can operate to remove from a digitized IF signal a known interferer with a known waveform such as an off-centered unmodulated interferer or a modulated interferer.

Although two embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A communications terminal having a receiver for substantially removing a known interferer signal from an intermediate frequency signal, said communications terminal comprising:
   at least one combination of a mixer and filter for translating in an analog domain a received signal to the intermediate frequency signal while maintaining separation from baseband;
   a digitizer for digitally translating the intermediate frequency signal containing the known interferer signal from said analog domain into a digital domain;
   an interference cancellation system, coupled to the digitizer, for substantially removing the known interferer signal from within a desired bandwidth of the digitally translated intermediate frequency signal; and
   a digital demodulator, coupled to the interference cancellation system, for demodulating the digitally translated intermediate frequency signal after removing the known interferer signal therefrom.

2. The communications terminal of claim 1, wherein said known interferer signal further includes a first unmodulated interferer signal centered in a middle of a channel used by the receiver, said interference cancellation system further including:
   a frequency adjustor for rotating in the digital domain the digitally translated intermediate frequency signal to baseband; and
   a DC offset compensator, coupled to the frequency adjuster, for removing a DC offset signal within the rotated intermediate frequency signal, said DC offset signal due to the first unmodulated interferer signal.

3. The communications terminal of claim 1, wherein said known interferer signal further includes a first unmodulated interferer signal centered in a middle of a channel used by the receiver, said interference cancellation system further including:
   said digitizer for translating the digitally translated intermediate frequency signal containing the known interferer signal down to baseband; and
   a DC offset compensator, coupled to the digitizer, for removing a DC offset signal attributable to the first unmodulated interferer signal within the intermediate frequency signal.

4. The communications terminal of claim 2, wherein said first unmodulated interferer signal further includes a 72nd harmonic of a 13 MHZ internal clock, and said channel further includes channel 5 defined by a Global System for Mobile Communications Standard.

5. The communications terminal of claim 2, wherein said first unmodulated interferer signal further includes a 73rd harmonic of a 13 MHZ internal clock, and said channel further includes channel 70 defined by a Global System for Mobile Communications Standard.

6. The communications terminal of claim 2, wherein said frequency adjustor further includes a selected one of a derotation unit and a frequency normation unit.

7. The communications terminal of claim 1, wherein said receiver further includes a selected one of a heterodyne receiver, a superheterodyne receiver, a double superheterodyne receiver and a low intermediate frequency receiver.

8. The communications terminal of claim 1, wherein said digitizer further includes a selected one of an intermediate frequency sampling receiver and a phase-amplitude digitizer.

9. The communications terminal of claim 1, wherein said known interferer signal having a known waveform further includes a modulated interferer signal or a second unmodulated interferer signal off-centered to a middle of a channel used by the receiver, said interference cancellation system further including a digital signal processing means for removing the known interferer signal from the digitally translated intermediate frequency signal.

10. A receiver for substantially removing a centered unmodulated interferer signal from an intermediate frequency signal, said receiver comprising:
    at least one combination of a mixer and filter for translating in an analog domain a received signal to the intermediate frequency signal while maintaining separation from baseband;
    a digitizer for digitally translating the intermediate frequency signal containing the centered unmodulated interferer signal from said analog domain into a digital domain;
    an interference cancellation system, coupled to the digitizer, for substantially removing a DC offset within a desired bandwidth of the digitally translated intermediate frequency signal, said DC offset due to the centered unmodulated interferer signal being located within a middle of a channel used by the receiver; and
    a digital demodulator, coupled to the interference cancellation system, for demodulating the digitally translated intermediate frequency signal after removing the DC offset therefrom.

11. The receiver of claim 10, wherein said interference cancellation system further includes:
    a frequency adjustor for rotating in digital domain the digitally translated intermediate frequency signal to baseband;
    a first convertor for converting the rotated intermediate frequency signal from a log-polar format to a Cartesian format;
    a DC offset compensator for removing the DC offset within the converted intermediate frequency signal; and
    a second convertor for converting the intermediate frequency signal having the removed DC offset from the Cartesian format to the log-polar format.

12. The receiver of claim 10, wherein said digitizer translates the intermediate frequency signal containing the centered unmodulated interferer signal down to baseband; and
    said interference cancellation system further includes a DC offset compensator for removing the DC offset signal attributable to the centered unmodulated interferer signal.

13. The receiver of claim 10, wherein said centered unmodulated interferer signal further includes a 72nd harmonic of a 13 MHZ internal clock, and said channel further includes channel 5 defined by a Global System for Mobile Communications Standard.

14. The receiver of claim 10, wherein said first unmodulated interferer signal further includes a 73rd harmonic of a 13 MHZ internal clock, and said channel further includes channel 70 defined by a Global System for Mobile Communications Standard.

15. The receiver of claim 11, wherein said frequency adjustor further includes a selected one of a derotation unit and a frequency normation unit.

16. The receiver of claim 10, wherein said digitizer further includes a selected one of an intermediate frequency sampling receiver and a phase-amplitude digitizer.

17. A receiver for substantially removing an off-centered unmodulated interferer signal or a modulated interferer signal each having a known waveform from an intermediate frequency signal, said receiver comprising:

at least one combination of a mixer and filter for translating in an analog domain a received signal to the intermediate frequency signal while maintaining separation from baseband;

a digitizer for digitally translating the intermediate frequency signal from said analog domain into a digital domain, said intermediate frequency signal containing the off-centered unmodulated interferer signal or the modulated interferer signal;

an interference cancellation system, coupled to the digitizer, for substantially removing the known waveform from within a desired bandwidth of the digitally translated intermediate frequency signal, said known waveform associated with the off-centered unmodulated interferer signal or the modulated interferer signal; and a digital demodulator, coupled to the interference cancellation system, for demodulating the digitally translated intermediate frequency signal after removing the known waveform therefrom.

18. A receiver for substantially removing an off-centered unmodulated interferer or a modulated interferer each having a known waveform from an intermediate frequency signal, said receiver comprising:

at least one combination of a mixer and filter for translating in an analog domain a received signal to the intermediate frequency signal while maintaining separation from baseband;

a digitizer for digitally translating the intermediate frequency signal from said analog domain into a digital domain, said intermediate frequency signal containing the off-centered unmodulated interferer or the modulated interferer;

an interference cancellation system, coupled to the digitizer, for substantially removing the known waveform from the digitally translated intermediate frequency signal, said known waveform associated with the off-centered unmodulated interferer or the modulated interferer; and a digital demodulator, coupled to the interference cancellation system, for demodulating the digitally translated intermediate frequency signal after removing the known waveform therefrom, wherein said interference cancellation system further includes:

a first convertor for converting the digitally translated intermediate frequency signal from a log-polar format to a Cartesian format;

a correlator for correlating the digitally translated intermediate frequency signal and the known waveform to enable the removal of the known waveform from the digitally translated intermediate frequency signal; and a second convertor for converting the digitally translated intermediate frequency signal having the removed known waveform from the Cartesian format to the log-polar format.

19. A method for substantially removing a known interferer signal from an intermediate frequency signal, said method comprising the steps of:

receiving a signal;

translating in an analog domain the signal to the intermediate frequency signal while maintaining separation from baseband;

digitally translating the intermediate frequency signal containing the known interferer signal from said analog domain into a digital domain;

removing the known interferer signal from within a desired bandwidth of the digitally translated intermediate frequency signal; and demodulating the digitally translated intermediate frequency signal after removing the known interferer signal therefrom.

20. The method of claim 19, wherein the known interferer signal further includes a first unmodulated interferer signal centered in a middle of a channel used by the receiver, said step of removing the known interferer signal further including the steps of:

translating the digitally translated intermediate frequency signal containing the known interferer signal down to baseband; and removing a DC offset signal attributable to the first unmodulated interferer signal within the intermediate frequency signal.

21. The method of claim 19, wherein the known interferer signal further includes a first unmodulated interferer signal centered in a middle of a channel used by the receiver, said step of removing the known interferer signal further including the steps of:

rotating in said digital domain the digitally translated intermediate frequency signal to baseband; and removing a DC offset within the intermediate frequency signal, said DC offset due to the first unmodulated interferer signal and removed by using a DC offset compensator.

22. The method of claim 21, wherein said first unmodulated interferer signal further includes a 72nd harmonic of a 13 MHZ internal clock, and said channel further includes channel 5 defined by a Global System for Mobile Communications Standard.

23. The method of claim 21, wherein said first unmodulated interferer signal further includes a 73rd harmonic of a 13 MHZ internal clock, and said channel further includes channel 70 defined by a Global System for Mobile Communications Standard.

24. The method of claim 19, wherein said receiver further includes a selected one of a heterodyne receiver, a superheterodyne receiver, a double superheterodyne receiver and a low intermediate frequency receiver.

25. A method for substantially removing a known interferer from an intermediate frequency signal, said method comprising the steps of:

receiving a signal;

translating in an analog domain the signal to the intermediate frequency signal while maintaining separation from baseband;

digitally translating the intermediate frequency signal containing the known interferer from said analog domain into a digital domain;

removing the known interferer from the digitally translated intermediate frequency signal; and demodulating the digitally translated intermediate frequency signal after removing the known interferer therefrom, wherein said known interferer has a known waveform and includes a modulated interferer or a second unmodulated interferer off-centered to a middle of a channel used by the receiver, said step of removing the known interferer further includes the step of correlating the digitally translated intermediate frequency signal and the known waveform to enable the removal of the known waveform from the digitally translated intermediate frequency signal, said known waveform is associated with the second unmodulated interferer signal or the modulated signal.

* * * * *